United States Patent [19]
Smith

[11] Patent Number: 4,739,566
[45] Date of Patent: Apr. 26, 1988

[54] PET TAG HOLDER

[76] Inventor: Cathlene P. Smith, 6661 Park La., Houston, Tex. 77023

[21] Appl. No.: 889,758

[22] Filed: Jul. 28, 1986

Related U.S. Application Data

[63] Continuation-in-part of Ser. No. 731,356, May 7, 1985, abandoned.

[51] Int. Cl.$^4$ ............................................... G09F 3/00
[52] U.S. Cl. ..................................... 40/303; 40/21 R
[58] Field of Search ............... 40/21 R, 303; 224/250, 224/253, 242, 240, 236, 237, 228, 223, 222, 903, 918, 902; 150/138, 152; 206/37.4, 37.5, 37.2, 37.3; 119/106

[56] References Cited

U.S. PATENT DOCUMENTS

| | | | |
|---|---|---|---|
| 842,037 | 1/1907 | Wallerstedt | 224/240 |
| 1,193,771 | 8/1916 | Evans | 150/152 |
| 1,262,447 | 4/1918 | Carr | 40/303 |
| 1,539,744 | 5/1925 | Kelly | 40/303 |
| 1,558,213 | 10/1925 | Atkins | 224/196 |
| 1,570,696 | 1/1926 | Moore et al. | 224/240 |
| 2,038,070 | 4/1936 | Welch | 206/37.5 |
| 2,097,070 | 10/1937 | Lago | 40/15 |
| 2,313,485 | 3/1943 | Stiller | 206/37.3 |
| 2,479,524 | 5/1945 | Tarbox | 150/40 |
| 2,648,150 | 8/1953 | Sullivan | 40/10 |
| 2,680,315 | 7/1950 | McHugh et al. | 40/17 |
| 3,890,733 | 6/1975 | Kubik | 224/253 |
| 4,044,932 | 8/1977 | Harris, Jr. | 224/26 |
| 4,069,954 | 1/1978 | Rauch | 224/223 |
| 4,174,793 | 11/1979 | Wisowaty | 224/240 |
| 4,259,798 | 4/1981 | McConnell | 40/10 |
| 4,310,040 | 1/1982 | Shainfeld | 206/37.4 |

Primary Examiner—Robert P. Swiatek
Assistant Examiner—Cary E. Stone
Attorney, Agent, or Firm—Vaden, Eickenroht, Thompson & Boulware

[57] ABSTRACT

A holder for pet tags which is attached to a typical pet collar. To prevent the tags from rattling, the holder has a flexible extension which secures on the tags when the holder is folded around the tags. The holder has flaps folded over the tags to give a neat appearance and to enclose and further secure the tags. The tags are secured to the holder by attachment utilizing the hole provided in the tag such as a screw. The holder is compact and fits neatly on the collar.

9 Claims, 2 Drawing Sheets

PET TAG HOLDER

This application is a continuation-in-part of U.S. Ser. No. 731,356 filed May 7, 1985 for "Pet Tag Holder", now abandoned.

BACKGROUND OF THE INVENTION

The present invention relates to a pet tag holder for multiple tags which will prevent the tags from rattling and provide a means for securely attaching the tags to a pet collar that is neat in appearance and function. The tag holder prevents the tags from dragging in pet feeding bowls. Also, the holder may prevent injury or strangulation of cats who like to climb fences and test tight places by eliminating dangling tags.

The necessity for a pet to have more than one tag on the collar arises from the statutory or ordinance requirements for evidence of compliance with vaccination laws and the desire of the pet owner to have an identification tag on the pet in case of loss. Although vaccination tags are sometimes engraved with owner identification information, there is usually not enough space for the name, address and phone numbers of the owner and the name of the pet. The tags are made of metal or some other rigid material which will withstand constant pet activity. The result is a collar with multiple tags which rattle and jangle every time the pet moves. This noise is particularly annoying at night or other times when the pet is indoors and the owner would like a relatively quiet environment.

The desirability for a quieting device for pet tags was recognized in the McConnell U.S. Pat. No. 4,259,798 which is a tag holder with spring arms extending from a single base which hold the tags together. Although the clamping of the tags quiets the rattling between the tags, this tag holder still could contact other metal parts of the collar to create an objectionable noise, because it hangs from one or more metal loops connected to the collar. The McConnell tag holder would be attached to the collar and the more unattractive tags for licensing or vaccination would be removed from the holder leaving only the attractive name tag during a pet show. The plates and spring arms used in this type of pet tag holder must be pried apart to insert and remove tags. When used with multiple tags the attractive and unattractive tags are in view and would not be versatile enough to hold effectively the various sizes, thickness and styles of tags commonly on the market today. Also, the tags extend from the holder so that they hang down from the collar and may get into feeding bowls, become entangled during pet's activities or become an object for the pet to chew on.

Apart form the dog show usage, there is a use for a tag quieting device for hunting dogs when dogs are used in the field. The collars with the tags are removed so the animal will be as quiet as possible. This necessitates removal of the collars and replacement after the hunt often for more than one animal. By using this type of tag holder, the hunting dogs would wear their collars and prevent distracting noise.

There is the desirability of having a compact multiple tag holder which can be worn at all times by the pet.

SUMMARY OF THE INVENTION

The present invention is for an attractive, neat appearing pet tag holder which is adjustable and/or versatile enough to satisfactorily hold multiple commercial sizes, shapes, thicknesses and numbers of pet tags completely quiet and which can be worn by cats or dogs comfortably on the various collar sizes sold commercially. The holder is constructed such that a pet collar slides through a portion of the holder making a compact, comfortable arrangement of the tags, holder and collar to be worn by the pet. The holder forms a compartment by folding over and encircling the tags while securing the tags in the holder to prevent rattling. The tags are easily removed or inserted by opening a flap on the holder and in the preferred embodiment unfastening a screw in the holder which threads through the tag holes and into a self-threading screw-hole molded in the body of the tag holder. The tags are further secured in the holder by a means which holds the tags firmly against one inner wall of the compartment. In the preferred embodiment pliable or semirigid fingers extend from the inside of inner flap and press the tags against the inner wall of the compartment. While the tags are totally encircled by the tag holder, the tags are not totally in an enclosed or airtight compartment which would trap moisture and possibly cause moisture relating problems such as mold growth and odor.

When the holder is closed, it fits in a compact manner on the pet's collar. The holder is not in a position to be chewed by the pet.

The holder is also noticeable on the pet collar so that one would open the holder to inquire about the identity of the pet.

The holder can be manufactured of molded plastic in a single piece, but also in a specified form which would allow flexibility in critical areas for versatility of adjustments, and semi-rigidness in other areas critical to durability in function of the tag holder embodiment.

DESCRIPTION OF THE PREFERRED EMBODIMENTS

Figure 1:
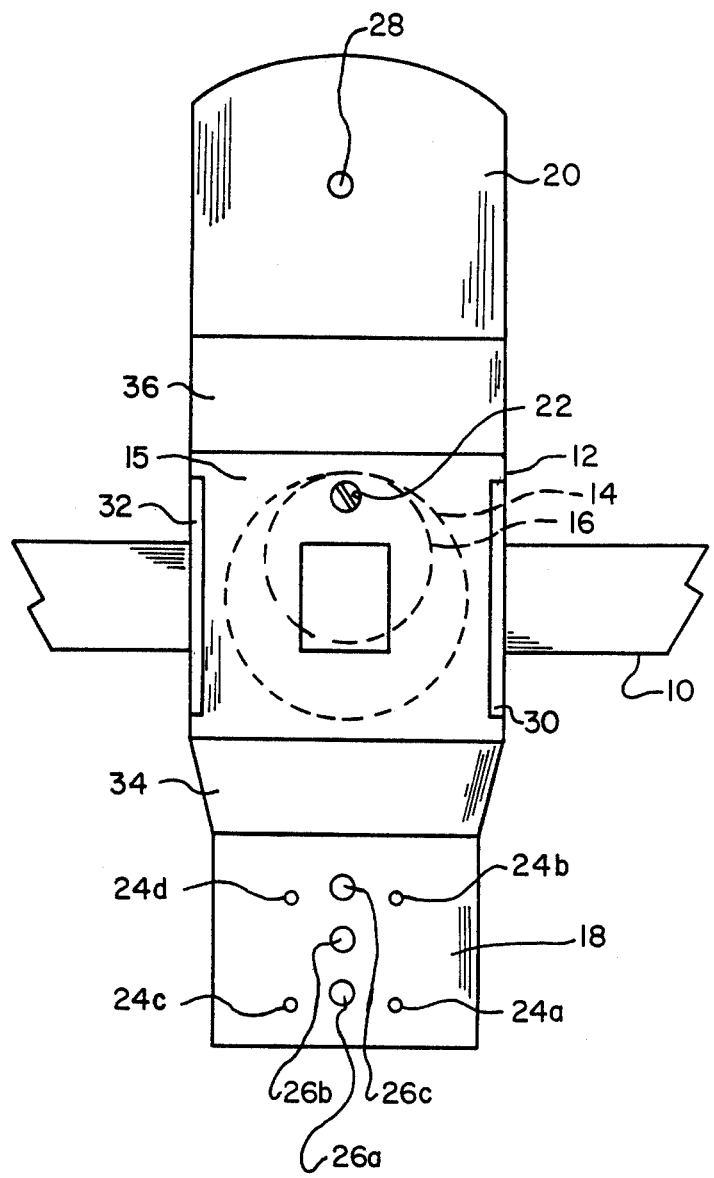
FIG. 1 is a view of a preferred embodiment showing the inside of the holder completely unfolded with two tags phantomed in and secured by the screw.

A preferred embodiment of the tag holder showing placement of tags is shown in FIG. 1. Tag holder 12 is a limber, elongate strip of material with a width larger than the tags to be held. Tag holder 12 preferably made of a molded plastic which is foldable. As shown in FIG. 1, the placement of two pet tags 14 and 16 are shown as fastened on the holder in a central location along the length of the holder. To either side of the central body 15 of the pet tag holder where the tags are placed, are an inner flap 18 and outer flap 20. In a molded plastic embodiment the central body 15, inner flap 18 and outer flap 20 are generally square and made of thicker plastic sections and are joined by generally rectangular thinner sections or creases 34 and 36. In other embodiments the central body, and flaps 18 and 20 could be a rigid material joined by the flexible creases 34 and 36 to provide a foldable structure. Crease 34 joins inner flap 18 to central body 15 and crease 36 joins outer flap 20 to central body 15. The flaps fold over the tags to totally encircle the tags when closed. In FIG. 1, the tags are attached to the holder 12 using a screw 22 which is sized to go through the holes provided in pet tags. The screw is received by a molded socket 38 (shown in FIGS. 2 and 3) in the wall of the pet tag holder.

In the preferred embodiment inner flap 18 is provided with at least one pliable finger of molded plastic extending from the inner wall of flap 18. The inner flap is provided with a means which is flexible yet provides a secure means to press against the pet tags when the inner flap is in place folded over the tags. The flexible, securing means could take the shape of a small, compressable loop molded on the inner wall of flap 18 or other shape instead of the pliable finger which would contact the tags when the inner flap is folded and in place yet would deform to some extent to allow the compression necessary to firmly secure the tags.

In FIG. 1, four pliable fingers 24a, 24b, 24c and 24d are shown. The pliable fingers extend from inner flap 18 so that the pet tags are contacted when the inner flap 18 is folded over the tags. The pliable fingers are of sufficient diameter of molded plastic to securely contact the tags and not buckle but deform or bend somewhat when pressed against the tags. Inner flap 18 is also provided with 3 openings, 26a, 26b and 26c which are centrally located on the flap and run in a line parallel to the outer edges of the inner flap 18. Outer flap 20 is sized to fold over the inner flap 18 and is provided with a ridged closure fastener 28 which is sized and situated on the outer flap to be received in one of the openings 26a, 26b or 26c on the inner flap.

The central body 15 of the pet tag holder is provided with sidewalls 30 and 32 which extend upward to the height of the tags to be protected and height of the screw head 22 but do not interfere with the folding of the inner flap 18 and outer flap 20. In the embodiment shown in FIG. 1, the inner flap 18 and outer flap 20 are attached to the central body of the pet tag holder by creases 34 and 36 which are made of a smaller thickness than the central body or flaps. Creases 34 and 36 are a foldable thickness.

Figure 2:
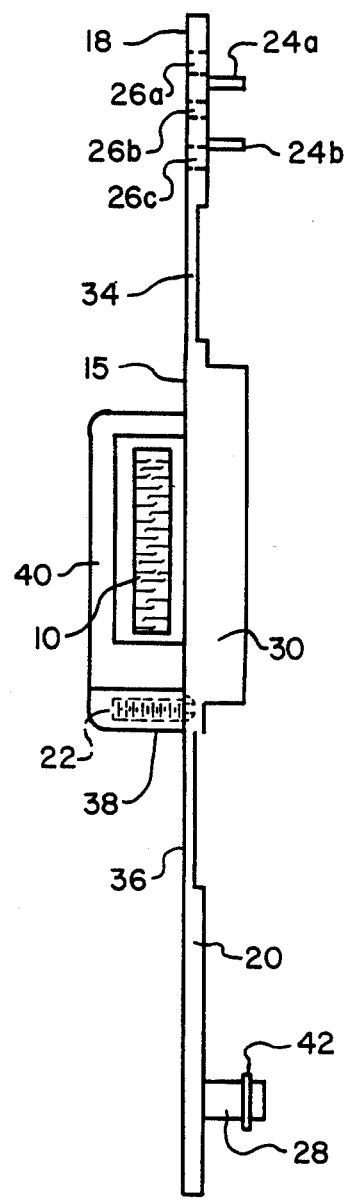
FIG. 2 is a view of the preferred embodiment showing a side view of the holder without tags completely unfolded.

FIG. 2 shows a side view of the pet tag holder. The pliable fingers 24a and 24b are shown extending from inner flap 18. Creases 34 and 36 are sized to comfortably fold over sidewalls 30 and 32. Molded socket 38 extends from and is between the central body 15 and crease 36 of the pet tag holder as shown in FIG. 2 which receives the placement of the screw 22 after threading the screw through the holes provided in the pet tag. Molded socket 38 is located centrally to the width of central body 15. The molded loop 40 is shown extending from the back of central body 15 of the pet tag holder and is sized to receive collar 10. Molded socket 38 is adjacent to the molded loop 40 and both extend from the back of the collar in approximately the same length. Also shown in FIG. 2 is ridged closure fastener 28 and the annular ridge 42 on the closure fastener. In the preferred embodiment, ridged closure fastener is located centrally on the inner wall of outer flap 20.

Figure 3:
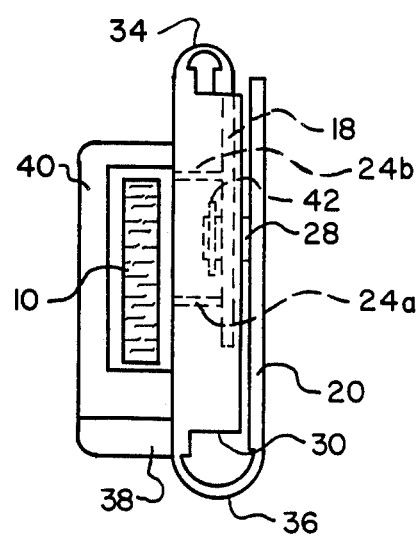
FIG. 3 is a side view of the preferred embodiment without tags fully folded and closed.

FIG. 3 shows the pet tag holder in the folded and closed position. When using the pet tag holder the tags (not shown in FIG. 3) are secured in the holder by threading screw 22 through the holes provided in the pet tags and then threading screw 22 into the hole provided in molded socket 38. After the pet tags have been secured in the central body 15 of the holder, inner flap 18 is folded over the pet tags and inside the sidewalls 30 and 32 on central body 15. The terminal ends of pliable fingers 24a, 24b, 24c and 24d firmly contact the pet tags (not shown) in the folded position. Outer flap 20 is folded over inner flap 18. Creases 34 and 36 are of a smaller thickness of material so that the folding is accomplished without resistance from the material. In the preferred embodiment the material is a molded plastic. The creases 34 and 36 are of sufficient thickness to undergo folding and unfolding operation without tearing or weakening.

As shown in FIG. 3 the creases are sized to accommodate the inner and outer flaps such that crease 34 is slightly shorter than crease 36 due to the smaller linear length necessary for the inner flap to fold over the tags and sidewalls 30 and 32 as compared to the longer linear length needed for the outer flap folding. Outer flap 20 is then folded over and ridged closure fastener 28 is inserted through one of openings 26a, 26b or 26c depending upon the alignment of the closure fastener 28 to the openings when folded over the tags which may vary in diameter and thickness and inner flap 18. The rigid closure fastener 28 is inserted through the opening on flap 18 which will provide the most secure and tight positioning of the pliable fingers against the pet tags as desired. The annular ridge 42 on closure fastener 28 is forced through the opening to provide a secure fit. In the closed position, the sidewalls 30 and 32 provide additional protection for the pet tags. When the tag holder is in the open position, the sidewalls aid in positioning the tags for fastening to the central body 15. The pet tag holder is then threaded through loop 40 onto the pet collar 10.

The tags may be held on the screw in a loose manner such that the screw 22 is not completely screwed into the molded socket 38. The head of screw 22 will extend to approximately the upper edge of sidewalls 30 and 32. When the tag holder is in the open position, the tags can be pivoted on the screw and slide over the sidewalls to view the front and back of the tag. The molded plastic sidewalls may have to be deformed somewhat to allow for pivoting of the tags. The pliable fingers hold the tags in place when the holder is in the closed position even though the screw is not completely screwed into the molded socket.

The holder can be made of any limber and durable material which can withstand pet activity. Various colors of plastic can be used to make the tag holder attractive. For a hunting dog application, the color used could be of a type which will camouflage or blend in with the hunting landscape.

In other embodiments the tag holder can be fitted with any type of closure for the folded position such as a two part ball and socket, Velcro or other fastener. Also, any means for attaching the pet tags to the holder can be used.

The pet tag holder can be attached to any type of pet collar or collar-type chain. The envelope wrap of the holder around the tags is a compact attractive arrangement for the collar of a pet. The holder can be of a desired color and size. The holder not only prevents the tags from the unwanted jangling, but also provides a securing means to the collar.

What is claimed is:
1. A pet tag holder comprising:
   an elongate member which can be folded around at least one pet tag with a width at least slightly larger than the pet tag;
   at least one pliable finger extending from said elongate member for contacting said pet tags and holding them securely against said elongate member when folded around said tags;

means for attaching pet tag to said elongate member utilizing the holes provided in a pet tag;

means for fastening said elongate member to itself after folding said elongate member around at least one pet tag; and means for attaching said elongate member to a pet collar.

2. A pet tag holder according to claim 1 in which said elongate member is made of plastic.

3. A pet tag holder according to claim 1 in which said means for attaching a pet tag to said elongate member is a screw and said elongate member is provided with a socket hole to accept the screw.

4. A pet tag holder according to claim 1 in which said means for fastening said elongate member to itself is a ridged finger which inserts snugly into a receiving opening.

5. A pet tag holder according to claim 1 in which said means for attaching said elongate member to a pet collar is a molded band on said elongate member through which a pet collar can pass.

6. A pet tag holder according to claim 1 in which said elongate member comprises a central body to which said pet tags are secured, foldable sections on either side of said central body, each foldable section attached to flap sections so that an inner flap section and outer flap section folds over said central body.

7. A pet tag holder of claim 6 wherein said central body, said inner flap section and said outer flap section are of a rigid construction.

8. A pet tag holder of claim 1 wherein said elongate member has two sidewalls extending from its opposite outer edges at the attachment of said pet tags on said elongate member extending a length of approximately slightly longer than the diameter of said pet tags, said sidewalls sized not to interfere with the folding of said elongate member around said pet tag.

9. A pet tag holder comprising an elongate plastic member which can be folded around at least one pet tag;

a generally square central body in the middle of said elongate member;

means for attaching pet tags in said central body;

one end of said elongate member forming an inner flap when folded over said central body where the tags are held;

at least one pliable finger extending from the inside of said inner flap which terminal end firmly contact and press against the tags in the folded position;

an outer flap formed by the opposite end of said elongate member which forms the inner flap; means for attaching said outer flap to said inner flap when both flaps are folded over the pet tag; and means for attaching said pet tag holder to pet collar.

* * * * *